(12) United States Patent
Nakashima et al.

(10) Patent No.: US 6,355,736 B1
(45) Date of Patent: Mar. 12, 2002

(54) PROPYLENE BLOCK COPOLYMER COMPOSITIONS

(75) Inventors: Takanori Nakashima; Shinichi Akitaya; Yoshitaka Morimoto; Yoshitaka Sumi, all of Ichihara (JP)

(73) Assignees: Chisso Corporation, Osaka; Chisso Petrochemical Corporation, Tokyo, both of (JP)

( * ) Notice: Subject to any disclaimer, the term of this patent is extended or adjusted under 35 U.S.C. 154(b) by 0 days.

(21) Appl. No.: 09/693,996

(22) Filed: Oct. 23, 2000

(30) Foreign Application Priority Data

Nov. 2, 1999 (JP) ............................................ 11-312047

(51) Int. Cl.$^7$ ........................... C08L 23/16; C08L 23/12
(52) U.S. Cl. ........................ 525/323; 525/240; 525/243
(58) Field of Search ................................. 525/323, 240, 525/243

(56) References Cited

U.S. PATENT DOCUMENTS

| | | | |
|---|---|---|---|
| 6,117,946 A | * | 9/2000 | Kume et al. |
| 6,211,300 B1 | * | 4/2001 | Terano et al. |
| 6,225,414 B1 | * | 5/2001 | Kume et al. |
| 6,300,415 B1 | * | 10/2001 | Okayama et al. |

FOREIGN PATENT DOCUMENTS

| | | |
|---|---|---|
| JP | 56-72042 | 6/1981 |
| JP | 57-63350 | 4/1982 |
| JP | 1-225648 | 9/1989 |
| JP | 5-331327 | 12/1993 |
| JP | 6-93062 | 4/1994 |
| JP | 6-145268 | 5/1994 |
| JP | 10-87744 | 4/1998 |

* cited by examiner

Primary Examiner—Tae H. Yoon
(74) Attorney, Agent, or Firm—Oblon, Spivak, McClelland, Maier & Neustadt, P.C.

(57) ABSTRACT

A propylene block copolymer composition is disclosed which comprises (A) a propylene-α-olefin random copolymer with a propylene content of 99.4 to 99.9 mol % and (B) a propylene-α-olefin random copolymer with a propylene content of 35 to 60 mol %, α-olefin contained in the random copolymer (A) being ethylene and/or 1-butene, wherein the intrinsic viscosity ($[\eta_B]$) of the propylene-α-olefin random copolymer (B) ranges from 0.5 to 2.0 dl/g, the ratio ($[\eta_B]/[\eta_A]$) of the intrinsic viscosity ($[\eta_B]$) of the propylene-α-olefin random copolymer (B) to the intrinsic viscosity ($[\eta_A]$) of the propylene-α-olefin random copolymer (A) ranges from 0.3 to 1.2 and the product $(([\eta_B]/[\eta_A]) \times (W_A/W_B))$ of the intrinsic viscosity ratio ($[\eta_B]/[\eta_A]$) and the weight ratio ($W_A/W_B$) of both copolymers ranges from 1.0 to 3.0. The propylene block copolymer composition is suitable as a raw material for molded article having excellent see-through property, transparency, stress-whitening resistance, stiffness and heat resistance.

3 Claims, 1 Drawing Sheet

PROPYLENE BLOCK COPOLYMER COMPOSITIONS

FIELD OF THE INVENTION

This invention relates to propylene block copolymer compositions, and more particularly to propylene block copolymer compositions which are suitable for a raw material for molded articles having excellent see-through property, transparency, stress-whitening resistance, stiffness and heat resistance.

BACKGROUND OF THE INVENTION

Polypropylene resins have been used in a wide variety of the fields, because of their being relatively cheap and having excellent characteristics. In general, however, a propylene homopolymer has high stiffness, but poor impact resistance, especially impact resistance at low temperature. For improving the impact resistance at low temperature of propylene homopolymer, propylene block copolymer compositions have been provided wherein to propylene homopolymer component as initially produced is introduced an ethylene-propylene random copolymer component as subsequently produced. The propylene block copolymer compositions have been employed in various industrial fields including automobiles and household appliances.

The prior propylene block copolymer compositions have excellent impact resistance, but have the disadvantages that they are inferior in see-through property and transparency to homopolymer and an area stressed tends to whiten. As a method to alleviate the disadvantage of whitening by impact in the propylene block copolymer composition, there have been proposed a method of increasing the content of an ethylene unit in the copolymer component and a method of adding polyethylene to the propylene block copolymer composition. Both methods are excellent in an improvement of impact resistance, but reduce the transparency of the product.

JP-A-5-331327 discloses a polymer composition comprising a propylene block copolymer composition with the specified ratio of the intrinsic viscosity of a propylene homopolymer component to that of an ethylene propylene random copolymer component.

JP-A-6-145268 discloses a polymer composition with the specified intrinsic viscosity of a propylene homopolymer component, the specified ratio of the intrinsic viscosity of a propylene homopolymer component to that of an ethylene propylene copolymer component and the specified ethylene content in the ethylene propylene random copolymer component.

JP-A-56-72042 and JP-A-57-63350 disclose a polyolefin resin composition wherein an ethylene-propylene copolymer containing a small amount of ethylene is blended with other ethylene-propylene copolymer.

JP-A-10-87744 discloses a propylene type resin composition wherein a small amount of ethylene is incorporated into a propylene homopolymer component in the ethylene-propylene block copolymer.

These polymer compositions have been more improved than conventional propylene block copolymer compositions in respect of the stress-whitening resistance and transparency as seen from the result of stress-whitening test and the haze measured for the injection-molded articles of the polymer compositions, but more improvements have been required. Further, there is a problem of reducing see-through property of the articles, due to the presence of optical unevenness in the molded article which inhibits a direct advance of light. Therefore, more improvement has been desired.

In addition, blending various components may bring about unbalance of properties for each product, due to uneven dispersion of each component in the final product. This blending operation is not desirable.

SUMMARY OF THE INVENTION

An object of the invention is to provide a propylene block copolymer composition which is suitable for a raw material for molded articles having excellent see-through property, transparency, stress-whitening resistance, stiffness and heat resistance.

Other objects of the invention will be apparent from the description mentioned later.

As a result of various investigations to attain the above-described objects, we have found that a propylene block copolymer composition comprising (A) a propylene-α-olefin random copolymer and (B) a propylene-α-olefin random copolymer of different composition from the random copolymer (A) has excellent stress-whitening resistance and see-through property, when a composition of both random copolymers, an intrinsic viscosity of the propylene-α-olefin random copolymer (B), the ratio of the intrinsic viscosities of both random copolymers and a product of the intrinsic viscosity ratio and the weight ratio of both random copolymers are within the prescribed ranges.

Thus the present invention relates to a propylene block copolymer composition comprising (A) a propylene-α-olefin random copolymer with a propylene content of 99.4 to 99.9 mol % and (B) a propylene-α-olefin random copolymer with a propylene content of 35 to 60 mol %, α-olefin contained in the random copolymer (A) being ethylene and/or 1-butene, wherein the intrinsic viscosity ($[\eta_B]$) of the propylene-α-olefin random copolymer (B) ranges from 0.5 to 2.0 dl/g, the ratio ($[\eta_B]/[\eta_A]$) of the intrinsic viscosity ($[\eta_B]$) of the propylene-α-olefin random copolymer (B) to the intrinsic viscosity ($[\eta_A]$) of the propylene-α-olefin random copolymer (A) ranges from 0.3 to 1.2 and the product ($([\eta_B]/[\eta_A]) \times (W_A/W_B)$) of the intrinsic viscosity ratio ($[\eta_B]/[\eta_A]$) and the weight ratio ($W_A/W_B$) of both copolymers ranges from 1.0 to 3.0.

The invention also relates to the propylene block copolymer composition wherein the propylene-α-olefin random copolymer (B) contains not less than 80% by weight of a component soluble in xylene at 20° C., based on the weight of the copolymer (B).

The invention further relates to the propylene block copolymer composition wherein the content of the propylene-α-olefin random copolymer (B) is from 22 to 40% by weight, based on the weight of the propylene block copolymer composition.

DETAILED DESCRIPTION OF THE INVENTION

Figure 1:
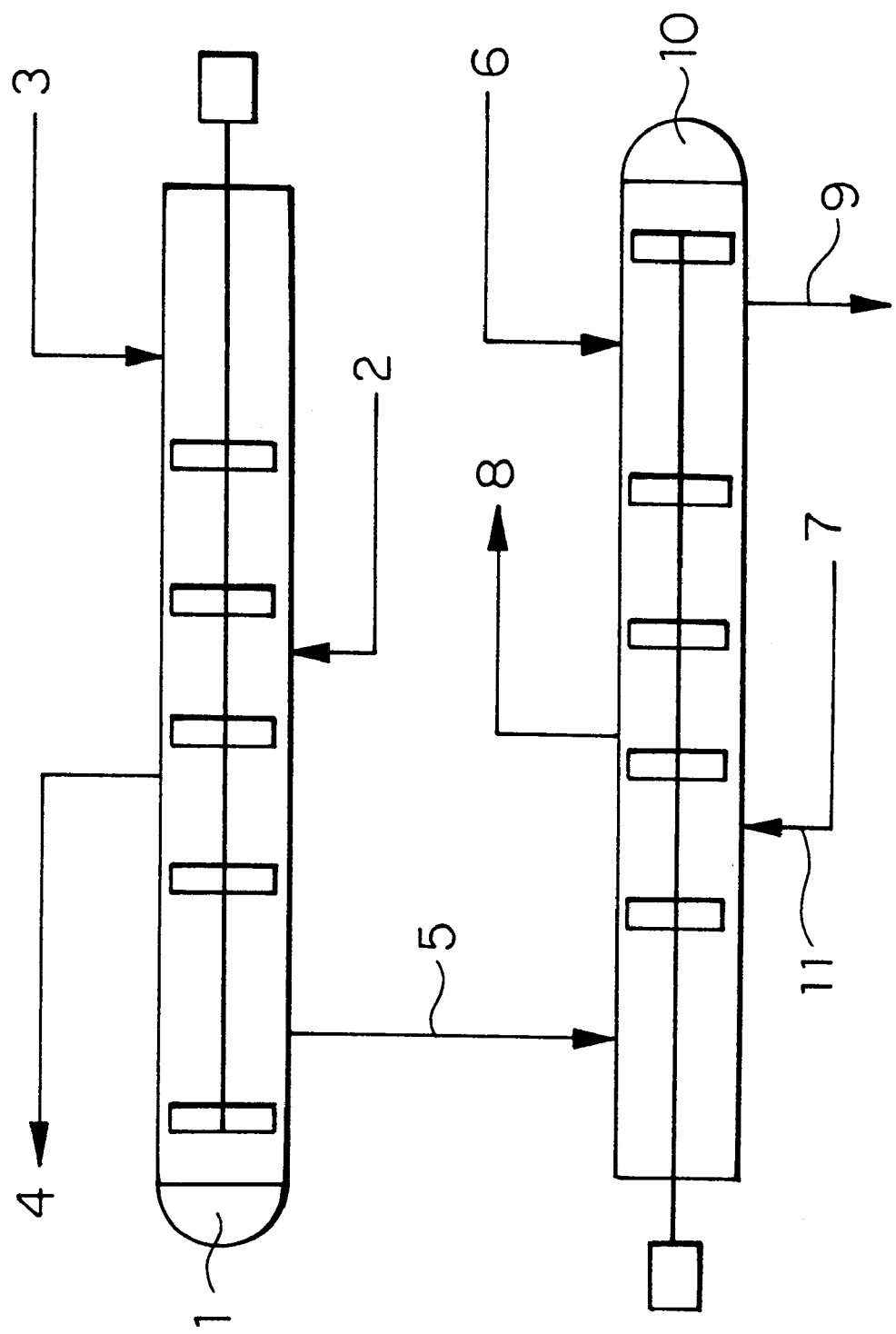
FIG. 1 is a flow sheet showing a continuous polymerization apparatus used in the Examples and Comparative Examples.

The propylene-α-olefin random copolymer (A) constituting the propylene block copolymer composition of the invention contains 99.4–99.9 mol % of a propylene unit and 0.1–0.6 mol % of an α-olefin unit other than propylene. It is desirable that the propylene-α-olefin random copolymer (A) contains 99.5–99.9 mol % of a propylene unit and 0.1–0.5 mol % of an α-olefin unit other than propylene.

If the propylene-α-olefin random copolymer (A) is a propylene homopolymer or the propylene content in the copolymer (A) exceeds 99.9 mol %, a crystallinity of the copolymer (A) becomes higher, thereby inhibiting a direct advance of light in the resulting propylene type block copolymer (A), so that the see-through property may not be sufficiently obtained in the molded articles which use the propylene block copolymer composition as a raw material (hereafter called "molded article"). If the propylene content in the copolymer (A) is less than 99.4 mol %, a crystallinity of the copolymer (A) lowers, so that a stiffness and a heat resistance of the molded article may lower.

The term "see-through property" as used herein for molded article refers to a property evaluating a clarity of an object when the object is viewed through the molded article. The transparency of molded article is evaluated by the value of haze measured in accordance with ASTM D 1003, but it does not always correlate to the see-through property.

As an α-olefin in the propylene-α-olefin random copolymer (A), ethylene and/or 1-butene is used. These olefins are preferable from a viewpoint of cost.

The propylene-α-olefin random copolymer (B) constituting the propylene block copolymer composition of the invention contains 35–60 mol % of a propylene unit and 40–65 mol % of an α-olefin unit other than propylene. It is especially preferable that the propylene-α-olefin random copolymer (B) contains 40–60 mol % of a propylene unit and 40–60 mol % of an α-olefin unit other than propylene.

If the propylene content in the copolymer (B) exceeds 60 mol %, an impact resistance at low temperature of the molded article becomes insufficient. If the propylene content in the copolymer (B) is less than 35 mol %, a see-through property and a transparency of the molded article may lower.

α-Olefins contained in the propylene-α-olefin random copolymer (B) can include ethylene, 1-butene, 1-pentene, 1-hexene, 1-octene, 1-decene, 1-dodecene, 4-methyl-1-pentene and 3-methyl-1-pentene. One or more olefins may be used. Ethylene and 1-butene are preferable.

For the propylene-α-olefin random copolymer (B), the intrinsic viscosity $[\eta_B]$ as determined in tetralin at 135° C. is in the range of 0.5 to 2.0 dl/g, more preferably 1.3 to 2.0 dl/g, and the ratio ($[\eta_B]/[\eta_A]$) of the intrinsic viscosity of the copolymer (B) to that of the copolymer (A) ($[\eta_A]$) is in the range of from 0.3 to 1.2, preferably from 0.4 to 1.2, the intrinsic viscosity of each copolymer (A) and (B) being measured under the same condition.

Since the intrinsic viscosity ($[\eta_B]$) of the propylene-α-olefin random copolymer (B) cannot be directly measured, it is calculated from the intrinsic viscosity ($[\eta_A]$) of the propylene-α-olefin random copolymer (A), the intrinsic viscosity ( $[\eta_{WHOLE}]$ ) of the final product, the propylene block copolymer composition and the weight % ($W_B$) of the propylene-α-olefin random copolymer (B) in the composition which can be directly measured, in accordance with the following equation.

$$[\eta_B]=\{[\eta_{WHOLE}]-(1-W_B/100)[\eta_A]\}/(W_B/100)$$

The intrinsic viscosity ($[\eta_B]$) of the propylene-α-olefin random copolymer (B) has an effect on the molding cycle and the transparency of molded articles. The ratio (($[\eta_B]/[\eta_A]$) of the intrinsic viscosity ($[\eta_B]$) of the propylene-α-olefin random copolymer (B) to the intrinsic viscosity ($[\eta_A]$) of the propylene-α-olefin random copolymer (A) has an effect on the dispersibility of the propylene-α-olefin random copolymer (B) in the propylene-α-olefin random copolymer (A). If the intrinsic viscosity ($[\eta_B]$) of the propylene-α-olefin random copolymer (B) exceeds 2.0 dl/g, the molding cycle increases and the productivity of molded article lowers. If the intrinsic viscosity ($[\eta_B]$) is less than 0.5 dl/g, the molded article may be sticky.

If the intrinsic viscosity ratio ($[\eta_B]/[\eta_A]$) exceeds 1.2, the transparency of molded article lowers. If the ratio is less than 0.3, the impact resistance at low temperature of molded article lowers.

In the propylene block copolymer composition of the present invention, the weight ratio ($W_A/W_B$) of the propylene-α-olefin random copolymer (A) to the propylene-α-olefin random copolymer (B) is such that a product (($[\eta_B]/[\eta_A]$)×($W_A/W_B$)) of the intrinsic viscosity ratio ($[\eta_B]/[\eta_A]$) and the weight ratio ($W_A/W_B$) of both copolymers is in the range of from 1.0 to 3.0. The product of the weight ratio and the intrinsic viscosity ratio of both copolymers is an index showing the stress-whitening resistance of the composition. If the product value is less than 1.0, the stress-whitening resistance of molded article is improved, but the heat resistance and the stiffness lower largely. If it exceeds 3.0, the aimed effect for improving the stress-whitening resistance becomes insufficient.

It is desirable that the propylene-α-olefin random copolymer (B) contains not less than 80% by weight, preferably 85% by weight of a component soluble in xylene at 20° C., based on the weight of the copolymer (B). If the component soluble in xylene at 20° C. is not less than 80% by weight, the see-through property of molded article is excellent.

Since the weight % of the 20° C. xylene soluble component in the propylene-α-olefin random copolymer (B) ($CXS_B$) cannot be directly measured, it is calculated from the weight % of the 20° C. xylene soluble component in the propylene-α-olefin random copolymer (A) ($CXS_A$), the weight % of the 20° C. xylene soluble component in the propylene block copolymer composition ($CXS_{WHOLE}$) and the weight % of the propylene-α-olefin random copolymer (B) ($W_B$), in accordance with the following equation.

$$CXS_B=\{CXS_{WHOLE}-(1-W_B/100)CXS_A\}/(W_B/100)$$

It is preferable that the propylene block copolymer composition of the present invention comprises 80 to 40% by weight of the propylene-α-olefin random copolymer (A) and 20 to 60% by weight of the propylene-α-olefin random copolymer (B), based on the weight of the copolymer composition. Especially, when the propylene-α-olefin random copolymer (A) is from 78 to 60% by weight and the propylene-α-olefin random copolymer (B) is from 22 to 40% by weight, the stiffness and the impact resistance at low temperature of molded articles are both excellent.

The propylene block copolymer composition of the invention can be produced by any method if it satisfies the above-mentioned various conditions, but it can be suitably produced by a two-stage continuous polymerization process in a vapor phase.

The two-stage continuous polymerization process comprises continuously conducting the first polymerization step wherein propylene and other α-olefins than propylene are copolymerized in a vapor phase in the presence of a catalyst for olefin polymerization to produce a prescribed amount of the propylene-α-olefin random copolymer (A) having the specified composition, and successively conducting the second polymerization step wherein propylene and other α-olefins than propylene are copolymerized by varying the composition ratio to produce a prescribed amount of the remaining propylene-α-olefin random copolymer (B).

Catalysts for olefin polymerization used in the process for the production as mentioned above are not limited in particular. Known catalysts such as titanium and metallocene type catalysts can be used in the process. Of these catalysts, titanium type catalysts are suitable in view of cost.

The polymerization system used in the process may be any of batch, semi-continuous and continuous systems, but a continuous polymerization is industrially preferable.

The propylene block copolymer compositions of the present invention satisfying the above-mentioned properties can be used suitably as a raw material for the manufacture of molded articles having excellent see-through property.

More specifically, the propylene block copolymer compositions of the present invention can be served as raw materials for molded articles in various shapes formed by a variety of molding methods such as injection, extrusion, inflation and calendering. In molding, the propylene block copolymer composition of the present invention may be blended, if necessary, with inorganic fillers such as talc, calcium carbonate, silica and mica, and organic and inorganic pigments which are conventionally used for polyolefins. Further, known additives can be added, if necessary, such as antioxidants, neutralizers, weathering agents, antistatic agents, lubricants, foaming agents, flame retardants and transparent nucleating agents.

The invention is further illustrated by the following examples and comparative examples. The methods for the measurement of physical properties used therein are mentioned below.

a) Intrinsic viscosity (dl/g): It is measured in tetralin (tetrahydronaphthalene) at 135° C., using an automatic viscometer (AVS2-type, manufactured by MITSUI CHEMICALS, Co., Ltd., Japan).

b) α-Olefin content (mol %): It is measured by Infrared absorption spectroscopy.

c) Content of component soluble in xylene at 20° C. (20° C. xylene soluble component) (% by weight): It is measured in accordance with ISO/DIS 1873-1.

d) Melting point (° C).: About 10 mg of a sample hot pressed at 230° C. is measured with DSC 1090 manufactured by Du Pont Company.

EXAMPLE 1

1) Preparation of Catalyst for Olefin Polymerization

Titanium tetrachloride (60 ml) and toluene (40 ml) were charged in a glass flask purged with nitrogen to prepare a mixed solution. A suspension prepared from magnesium diethoxide (20 g) having an average particle diameter of 42 μm, toluene (100 ml) and di-n-butyl phthalate (7.2 ml) was added to the mixed solution kept at 10° C. Subsequently, the temperature of the resulting mixture was elevated from 10° C. to 90° C. over a period of 80 minutes and the mixture was reacted while stirring for 2 hrs. After completion of the reaction, the resulting solid product was washed four times with toluene (200 ml) at 90° C., and additional titanium tetrachloride (60 ml) and toluene (140 ml) were added thereto. The temperature of the mixture was elevated to 112° C. and the mixture was reacted while stirring for another 2 hrs. After completion of the reaction, the resultant solid product was washed 10 times with n-heptane (200 ml) at 40° C. to prepare an olefin polymerization catalyst (A-1). An average particle diameter of the resultant olefin polymerization catalyst was found to be 42 μm, and the catalyst had the following composition: Mg: 18.9% by weight, Ti: 2.2% by weight, Cl: 61.6% by weight.

2) Pre-activation of Olefin Polymerization Catalyst Component

A stainless steel reaction vessel (internal volume: 20 lit.) equipped with slant vanes was purged with nitrogen gas and then charged at room temperature with hexane (17.7 lit.), triethyl aluminum (100.6 mmol), di-isopropyl-di-methoxysilane (15.1 mmol) and the olefin polymerization catalyst (A-1) (120.4 g) as prepared above, and the mixture was warmed to 30° C. Subsequently, the catalyst was pre-activated by feeding propylene (240.8 g) while stirring over a period of 3 hrs. The result of the analysis indicated that 1.9 g of propylene was reacted per 1 g of the olefin polymerization catalyst.

3) First Polymerization Step

Referring to the flow sheet shown in FIG. 1, the polymerization steps are explained below.

The pre-activated catalyst at the rate of 0.4 g/hr, triethyl aluminum as an organoaluminum compound and di-isopropyl-di-methoxysilane as an organosilicon compound were continuously fed to a horizontal type polymerization reactor equipped with stirring vanes 1 (L/D=6, internal volume: 100 lit.) so that an Al/Mg molar ratio was 6 and an Al/Si molar ratio was 6. A mixed gas of ethylene and propylene having the composition shown in Table 1 was continuously fed, while maintaining the conditions: the reaction temperature of 60° C., the reaction pressure of 2.1 MPa and the stirring speed of 35 rpm. Further, hydrogen gas was continuously fed through circulation pipe 2 so that the hydrogen concentration in the vapor phase within the polymerization reactor was kept at the hydrogen/propylene molar ratio shown in Table 1, thereby adjusting the intrinsic viscosity of the resulting polymer, i.e., the propylene-α-olefin random copolymer (A).

Reaction heat was removed by heat of vaporization of a raw material, propylene fed through piping 3. Unreacted gas discharged from the polymerization reactor was cooled and condensed outside the reaction system via piping 4 and returned to polymerization reactor 1.

The resultant propylene-α-olefin random copolymer (A) was continuously taken out from the reactor 1 via piping 5 so that the polymer occupies 50% by volume of the reactor, and then it was fed to a polymerization reactor 10 in the second polymerization step. At this time, a part of the propylene-α-olefin random copolymer (A) was intermittently taken out from piping 5 to give a sample for measuring the ethylene content, intrinsic viscosity and yield of the polymer per unit weight of the catalyst. The yield of the polymer per unit weight of the catalyst was calculated from the content of Mg in the polymer measured by an inductively coupled plasma atomic emission spectrometry (ICP method).

4) Second Polymerization Step

The propylene-α-olefin random copolymer (A) from the first polymerization step and a mixed gas of ethylene and propylene were continuously fed to a horizontal type polymerization reactor equipped with stirring vanes 10 (L/D=6, internal volume: 100 lit.) to carry out a copolymerization of ethylene and propylene under the reaction conditions: the stirring speed of 25 rpm, the temperature of 55° C. and the pressure of 1.9 MPa. The gas composition in the vapor phase was controlled to give the ethylene/propylene molar ratio and the hydrogen/ethylene molar ratio shown in Table 1. Through piping 7, carbon monoxide was supplied as a polymerization inhibitor to control the amount of the propylene-α-olefin random copolymer (B) polymerized, and hydrogen gas was supplied to control the molecular weight of the propylene-α-olefin random copolymer (B).

Reaction heat was removed by heat of vaporization of a raw material, liquid propylene supplied from piping 6. Unreacted gas discharged from the polymerization reactor was cooled and condensed outside the reaction system via piping 8 and returned to the polymerization reactor 10. The propylene block copolymer composition produced in the second polymerization step was continuously taken out from polymerization reactor 10 via piping 9 so that the polymer occupies 50% by volume of the reactor.

The production rate of the propylene block copolymer composition was 8 to 15 kg/hr.

Unreacted monomers were removed from the propylene block copolymer composition taken from the reactor 10, and a part of the copolymer composition was subjected to the measurements of the intrinsic viscosity ($[\eta_{WHOLE}]$), the ethylene content by infrared absorption spectrum and the amount of the produced copolymer (B) by measuring the Mg content in the polymer by ICP method.

5) Production of Injection Molded Articles 0.004 kg of a phenol type heat stabilizer and 0.004 kg of calcium stearate were added to 4 kg of the powders as obtained above, and they were mixed at room temperature for 2 minutes using a high speed stirring mixer (trade name: Henschel mixer). The mixture was granulated into pellets by an extruding granulator with a screw diameter of 40 mm. Then, a test piece was prepared from the pellets using an injection molding machine in which the molten resin temperature was set at 250° C. and the mold temperature was set at 50° C. The resulting test piece was conditioned in a chamber kept at 50% humidity and at a temperature of 23° C. for 72 hours, and various properties thereof were measured according to the following methods. The results are shown in Table 1.

a) Flexural modulus (MPa): It was measured in accordance with JIS K 7203.
b) Haze: It was measured in accordance with ASTM D 1003 using a plate-like 25×50×1 mm test piece which was conditioned under the above condition.
c) See-through property: A white copy paper, on which a black character of 11 point is printed, is put (printed surface up) on a flat desk within the room at 50% humidity and 23° C. A plate-like 25 mm×50 mm×1 mm test piece as conditioned above was superimposed on the copy paper, and a visual observation was performed with the naked eye while increasing test pieces, by which there was determined a maximum number of the superimposed test piece which enables the character to be legible from a height of 30 cm over the copy paper. The observation was carried out under the fluorescent tube at 800–1000 lux. The see-through property was evaluated in accordance with the following rating.

| Maximum number of superimposed test piece | Rating |
| --- | --- |
| >4 | A |
| 3 | B |
| 2 | C |
| 1 | D |
| <1 | E |

If the maximum number of the superimposed test piece is not less than 3, the see-through property of the molded article is practical.

d) Izod impact strength: It was measured in accordance with JIS K 7110.
e) Whitening by impact: A load of 500 g was fallen from a height of 1 m on the conditioned plate-like 50×50×2 mm test piece, using a du Pont impact machine (manufactured by Toyo Seiki Co., Ltd.) with a center of impact 0.635 cm in radius and an anvil having an inner diameter of 3.81 cm, and a diameter of whitening area generated on the test piece by impact was measured.

EXAMPLES 2–4 and

Comparative Examples 1–5

Examples 2–4 and Comparative Examples 1–5 were carried out in the same manner as in Example 1 to prepare samples, except that the type of olefin, the molar ratio of α-olefin/propylene and that of hydrogen/propylene in the first polymerization step, and the molar ratio of ethylene/propylene and that of hydrogen/ethylene in the second polymerization step used in Example 1 were changed to those shown in Tables 1 and 2. The polymerization conditions and the results of physical properties measured for the samples are shown in Tables 1 and 2.

Industrial Applicability of the Invention

The molded articles produced from the propylene block copolymer composition of the present invention have well-balanced properties of see-through property, transparency, stress-whitening resistance, stiffness and heat resistance.

TABLE 1

|  | Example | | | |
| --- | --- | --- | --- | --- |
|  | 1 | 2 | 3 | 4 |
| Pre-activation treatment | | | | |
| Al/Ti/Si (molar ratio) | 2/1/0.3 | 2/1/0.3 | 2/1/0.3 | 2/1/0.3 |
| α-Olefin | Propylene | Propylene | Propylene | Propylene |
| Reaction amount (g olefin/g catalyst) | 1.9 | 1.9 | 1.9 | 1.9 |
| First polymerization step | | | | |
| Al/Si (molar ratio) | 6 | 6 | 6 | 6 |
| Polymerization pressure MPa | 2 | 2 | 2 | 2 |
| Polymerization temperature ° C. | 60 | 60 | 60 | 60 |
| α-Olefin component | Ethylene | Ethylene | Ethylene | 1-Butene |
| Hydrogen/propylene (molar ratio) | 0.008 | 0.002 | 0.027 | 0.008 |
| α-Olefin/propylene (molar ratio) | 0.002 | 0.004 | 0.002 | 0.005 |

TABLE 1-continued

|  | Example | | | |
|---|---|---|---|---|
|  | 1 | 2 | 3 | 4 |
| Copolymer (A) | | | | |
| Produced amount $W_A$ wt % | 69 | 68 | 75 | 67 |
| Propylene content mol % | 99.7 | 99.4 | 99.7 | 99.7 |
| $CXS_A$ wt % | 0.9 | 0.7 | 1.1 | 0.8 |
| Intrinsic viscosity $[\eta_A]$ dl/g | 2.23 | 3.32 | 1.67 | 2.23 |
| Second polymerization step | | | | |
| Polymerization pressure MPa | 1.9 | 1.9 | 1.9 | 1.9 |
| Polymerization temperature ° C. | 55 | 55 | 55 | 55 |
| α-Olefin component | Ethylene | Ethylene | Ethylene | Ethylene |
| Ethylene/propylene (molar ratio) | 0.33 | 0.26 | 0.33 | 0.33 |
| Hydrogen/ethylene (molar ratio) | 0.54 | 0.50 | 0.48 | 0.51 |
| Copolymer (B) | | | | |
| Produced amount $W_B$ wt % | 31 | 32 | 25 | 33 |
| Propylene content mol % | 54 | 59 | 54 | 54 |
| $CXS_B$ ($W_B$ weight basis) wt % | 95 | 98 | 93 | 93 |
| Intrinsic viscosity $[\eta_B]$ dl/g | 1.49 | 1.60 | 1.67 | 1.56 |
| Propylene block copolymer composition | | | | |
| $W_A/W_B$ | 2.23 | 2.13 | 3.00 | 2.03 |
| $CXS_{WHOLE}$ wt % | 30.1 | 31.8 | 24.1 | 31.3 |
| Intrinsic viscosity $[\eta_{WHOLE}]$ dl/g | 2.00 | 2.77 | 1.67 | 2.01 |
| Intrinsic viscosity ratio $[\eta_B]/[\eta_A]$ | 0.67 | 0.48 | 1.00 | 0.70 |
| $([\eta_B]/[\eta_A]) \times (W_A/W_B)$ | 1.49 | 1.02 | 3.00 | 1.42 |
| Physical properties of molded article | | | | |
| Flexural modulus MPa | 590 | 570 | 750 | 580 |
| Haze % | 48 | 39 | 52 | 47 |
| see-through property | A | A | A | A |
| Izod impact strength (0° C.) kJ/m² | NB*[1] | NB*[1] | 27.6 | NB*[1] |
| (−30° C.) | 10.1 | 16 | 5.3 | 10.5 |
| Melting point ° C. | 162 | 160 | 162 | 162 |
| Diameter of whitening by impact mm | 8.9 | 7.3 | 12.3 | 8.2 |

*[1]: Not destructed

TABLE 2

|  | Comparative Example | | | | |
|---|---|---|---|---|---|
|  | 1 | 2 | 3 | 4 | 5 |
| Pre-activation treatment | | | | | |
| Al/Ti/Si (molar ratio) | 2/1/0.3 | 2/1/0.3 | 2/1/0.3 | 2/1/0.3 | 2/1/0.3 |
| α-Olefin | Propylene | Propylene | Propylene | Propylene | Propylene |
| Reaction amount (g olefin/g catalyst) | 1.9 | 1.9 | 1.9 | 1.9 | 1.9 |
| First polymerization step | | | | | |
| Al/Si (molar ratio) | 6 | 6 | 6 | 6 | 6 |
| Polymerization pressure MPa | 2 | 2 | 2 | 2 | 2 |
| Polymerization temperature ° C. | 60 | 60 | 60 | 60 | 60 |
| α-Olefin component | — | — | — | — | Ethylene |
| Hydrogen/propylene (molar ratio) | 0.002 | 0.003 | 0.027 | 0.023 | 0.018 |
| α-Olefin/propylene (molar ratio) | — | — | — | — | 0.005 |
| Copolymer (A) | | | | | |
| Produced amount $W_A$ wt % | 66 | 70 | 75 | 80 | 67 |
| Propylene content mol % | 100 | 100 | 100 | 100 | 99 |
| $CXS_A$ wt % | 0.7 | 0.7 | 1.0 | 0.9 | 1.1 |
| Intrinsic viscosity $[\eta_A]$ dl/g | 3.03 | 2.81 | 1.67 | 1.72 | 2.04 |
| Second polymerization step | | | | | |
| Polymerization pressure MPa | 1.9 | 1.9 | 1.9 | 1.9 | 1.9 |
| Polymerization temperature ° C. | 55 | 55 | 55 | 55 | 55 |
| α-Olefin component | Ethylene | Ethylene | Ethylene | Ethylene | Ethylene |
| Ethylene/propylene (molar ratio) | 0.33 | 0.26 | 0.33 | 0.49 | 0.30 |
| Hydrogen/ethylene (molar ratio) | 0.21 | 0.25 | 0.21 | 0.15 | 0.34 |
| Copolymer (B) | | | | | |
| Produced amount $W_B$ wt % | 34 | 30 | 25 | 20 | 33 |

TABLE 2-continued

|  | Comparative Example | | | | |
| --- | --- | --- | --- | --- | --- |
|  | 1 | 2 | 3 | 4 | 5 |
| Propylene content mol % | 54 | 59 | 54 | 40 | 56 |
| $CXS_B$ ($W_B$ weight basis) wt % | 94 | 97 | 95 | 82 | 96 |
| Intrinsic viscosity $[\eta_B]$ dl/g | 3.09 | 2.91 | 1.67 | 3.67 | 1.98 |
| Propylene block copolymer composition | | | | | |
| $W_A/W_B$ | 1.94 | 2.33 | 3.00 | 4.00 | 2.03 |
| $CXS_{WHOLE}$ wt % | 32.4 | 29.6 | 24.5 | 17.1 | 32.3 |
| Intrinsic viscosity $[\eta_{WHOLE}]$ dl/g | 3.05 | 2.84 | 1.67 | 2.11 | 2.02 |
| Intrinsic viscosity ratio $[\eta_B/\eta_A]$ | 1.02 | 1.04 | 1.00 | 2.13 | 0.97 |
| $([\eta_B]/[\eta_A]) \times (W_A/W_B)$ | 1.98 | 2.42 | 3.00 | 8.53 | 1.97 |
| Physical properties of molded article | | | | | |
| Flexural modulus MPa | 580 | 670 | 770 | 890 | 540 |
| Haze % | 58 | 53 | 65 | 91 | 49 |
| See-through property | C | C | B | D | A |
| Izod impact strength (0° C.) kJ/m$^2$ | NB*[1] | NB*[1] | 30.2 | NB*[1] | NB*[1] |
| (−30° C.) | 12.3 | 13.6 | 4.9 | 9.6 | 11.5 |
| Melting point ° C. | 164 | 164 | 164 | 164 | 158 |
| Diameter of whitening by impact mm | 13.6 | 13.5 | 14.7 | 22.1 | 7.8 |

*[1]: Not destructed

What is claimed is:

1. A propylene block copolymer composition comprising (A) a propylene-α-olefin random copolymer with a propylene content of 99.4 to 99.9 mol % and (B) a propylene-α-olefin random copolymer with a propylene content of 35 to 60 mol %, α-olefin contained in the random copolymer (A) being ethylene and/or 1-butene, wherein the intrinsic viscosity ($[\eta_B]$) of the propylene-α-olefin random copolymer (B) ranges from 0.5 to 2.0 dl/g, the ratio ($[\eta_B]/[\eta_A]$) of the intrinsic viscosity ($[\eta_B]$) of the propylene-α-olefin random copolymer (B) to the intrinsic viscosity ($[\eta_A]$) of the propylene-α-olefin random copolymer (A) ranges from 0.3 to 1.2 and the product (($[\eta_B]/[\eta_A]$)×($W_A/W_B$)) of the intrinsic viscosity ratio ($[\eta_B]/[\eta_A]$) and the weight ratio ($W_A/W_B$) of both copolymers ranges from 1.0 to 3.0.

2. The copolymer composition of claim 1 wherein the propylene-α-olefin random copolymer (B) contains not less than 80% by weight of a component soluble in xylene at 20° C., based on the weight of the copolymer (B).

3. The copolymer composition of claim 1 or 2 wherein the content of the propylene-α-olefin random copolymer (B) is from 22 to 40% by weight, based on the weight of the propylene block copolymer composition.

* * * * *